350-96.18 SR

5/4/82 XR 4,328,488

United States Patent [19]

Yanai et al.

[11] 4,328,488

[45] May 4, 1982

[54] FLAME-DETECTING APPARATUS INCLUDING A FIELD-LIMITING DEVICE

[75] Inventors: Noboru Yanai, Musashino; Toshiyuki Komori, Fuchu; Atushi Ichioka, Machida; Masanori Imooka, Atsugi, all of Japan

[73] Assignee: Tokyo Shibaura Denki Kabushiki Kaisha, Japan

[21] Appl. No.: 105,309

[22] Filed: Dec. 19, 1979

[30] Foreign Application Priority Data

Jan. 12, 1979 [JP] Japan .............................. 54-1129[U]

[51] Int. Cl.[3] ...................... G01N 21/58; G08B 17/12

[52] U.S. Cl. .................................... 340/578; 250/229; 250/554; 350/96.18; 350/272

[58] Field of Search ................ 340/577, 578; 250/229, 250/237 R, 554; 328/6; 350/17, 266, 272, 319, 96.18

[56] References Cited

U.S. PATENT DOCUMENTS

| | | | |
|---|---|---|---|
| 2,339,754 | 1/1944 | Brace | 250/554 X |
| 2,354,400 | 7/1944 | Percy | 250/554 X |
| 2,972,930 | 2/1961 | Norwood | 350/272 X |
| 3,041,929 | 7/1962 | Norwood | 350/272 X |
| 3,504,183 | 3/1970 | Salkowski et al. | 250/229 X |
| 3,582,666 | 6/1971 | Geiger | 250/229 X |
| 3,824,391 | 7/1974 | Noltingh et al. | 340/578 X |
| 3,993,900 | 11/1976 | Hulme | 250/554 X |
| 4,037,113 | 7/1977 | Moore | 250/554 |
| 4,131,540 | 12/1978 | Husome et al. | 250/237 R X |

FOREIGN PATENT DOCUMENTS

| | | | |
|---|---|---|---|
| 54-142099 | 11/1979 | Japan | 340/578 |

*Primary Examiner*—John W. Caldwell, Sr.
*Assistant Examiner*—Joseph E. Nowicki
*Attorney, Agent, or Firm*—Finnegan, Henderson, Farabow, Garrett & Dunner

[57] ABSTRACT

In a flame-detecting apparatus for developing an electrical signal responsive to light, impinging on a light-responsive surface from a predetermined flame area, for example, in a combustion chamber, a convex lens member is disposed at a distance from the surface longer than the focal length of the lens member such that light impinging substantially perpendicularly to the lens member is converged then slightly diverged onto the light-receiving surface. An aperture-defining member is positioned approximately at a focal point of the lens member between the lens member and the light-receiving surface for only giving a light passage around a light axis of the lens member, the cross-sectional area of the light passage being smaller than that of the light-receiving surface so that extraneous light impinging obliquely on the lens member is prevented from passing to the light-receiving surface.

11 Claims, 11 Drawing Figures

11
12
13
14
15
16
17
18
19
20
20a
21
22
23
31
32
33
33a
33b
33c
34a
34b
35
36
37
40
41
42
43
44
45
46
47
48
49
50
Φ1
Φ2

FLAME-DETECTING APPARATUS INCLUDING A FIELD-LIMITING DEVICE

BACKGROUND OF THE INVENTION

This invention relates to apparatus for detecting flame such as, for example, a burner flame in a combustion chamber of a boiler and, more particularly, it relates to an improvement in field-limiting devices used with such apparatus.

The flame-detecting apparatus of this kind is required to be responsive to the particular flame from one certain burner, or from certain burners, to be monitored although there may be adjacent flame from at least one other burner. Limitation of the field of the flame detector, therefore, is required. A signal developed from the flame detector, which expresses typically whether or not there is a flame, is used to control the burner for safety needs, for example.

In particular there has been developed a field-limiting device for flame-detecting apparatus employing a lens member, which focuses light from a specific flame area impinging substantially perpendicularly on the lens member. The lens is mounted in one end of a cylindrical shell and focuses light rays from the flame source, impinging on the lens, onto a light-receiving member, such as the end of a fiberglass conduit, at the other end of the shell. However, light rays incident upon the lens, not arising from the flame to be monitored, tend to give false signals and reduce the reliability of the flame-detecting apparatus.

In the solution of these problems, dust particles in the ambient atmosphere and the relatively high level of heat, to which the apparatus is subject, must be considered.

SUMMARY OF THE INVENTION

It is, accordingly, an object of this invention to provide flame-detecting apparatus having an improved device for limiting the field to which it is responsive.

It is another object of this invention to provide flame-detecting apparatus having a field-limiting device which prevents extraneous light from causing erroneous signals.

It is still another object of this invention to provide flame-detecting apparatus with a field-limiting device of reliable structure under severe ambient conditions, such as a dusty atmosphere, relatively high heat, and the like.

According to this invention, the flame-detecting apparatus comprises: light-responsive means to develop an electric output signal; light guide means having a light-receiving surface for transmitting a light received by the surface to the light-responsive means; a convex lens member positioned at a distance from the surface longer than the focal length of the lens member, parallel light rays from a detected flame impinging substantially perpendicularly on the lens member being converged and diverging onto said surface; aperture-defining means positioned between the lens member and the surface at approximately a focal point of the lens member for giving a light passage around the light axis of the lens member, the passage having a cross-sectional area smaller than that of the surface; and a cylindrical shell member for housing the lens member and the aperture-defining member.

BRIEF EXPLANATION OF THE DRAWING

Further objects and features of this invention will be understood from the following detailed description and appended claims in conjunction with drawings, wherein:

FIGS. 4A and 4B through 7A and 7B are schematic diagrams of other embodiments of the aperture-defining member in FIG. 2.

DESCRIPTION OF THE PREFERRED EMBODIMENTS

Figures 1, 2, 3:
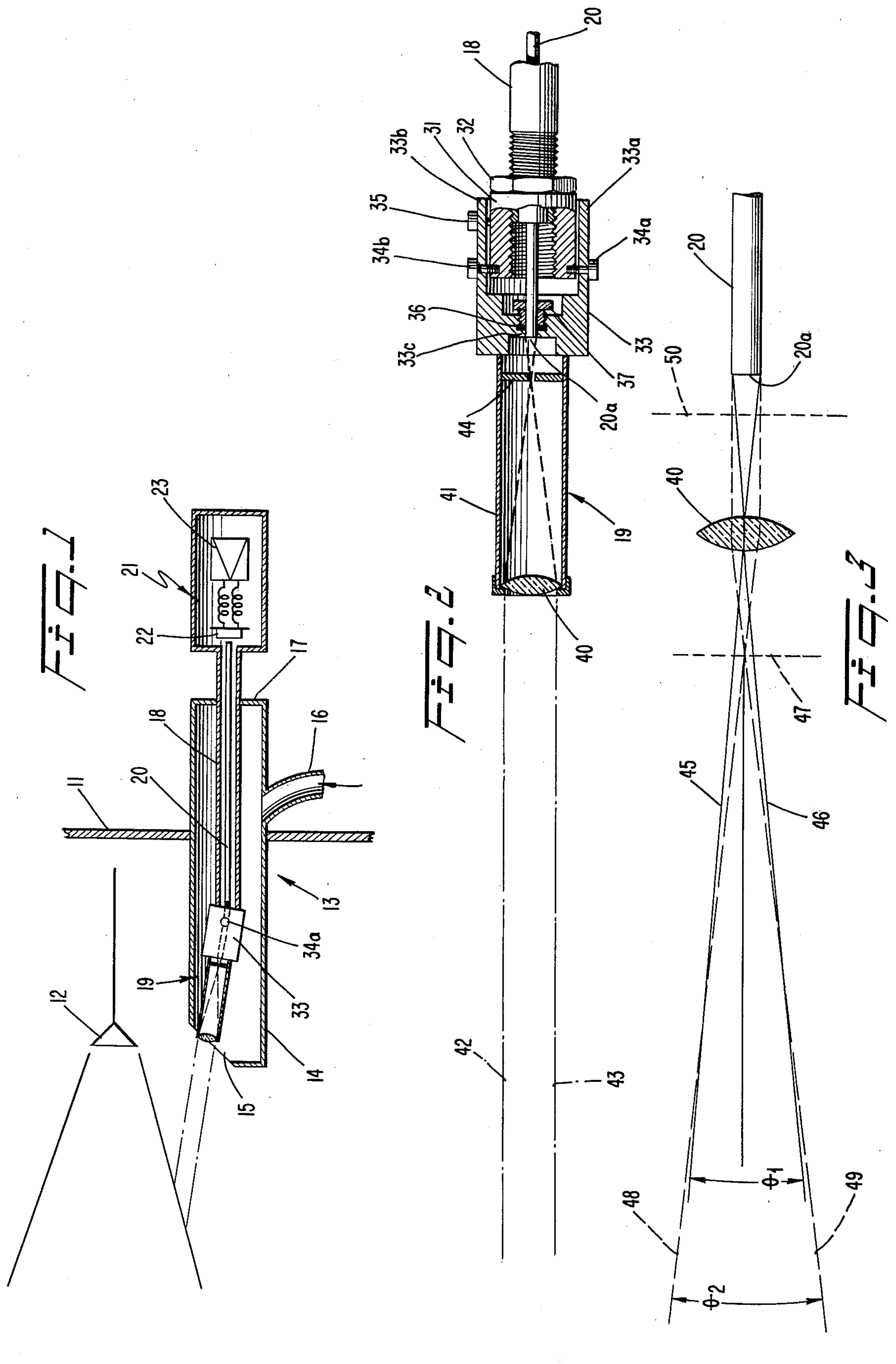
FIG. 1 shows a schematic view of an embodiment according to this invention.
FIG. 2 is a cross-sectional view of a field-limiting device for utilization in the embodiment shown in FIG. 1.
FIG. 3 is a diagram explaining effects on an aperture-defining member in the field-limiting device shown in FIG. 2.

Referring now to FIG. 1, reference numeral 11 identifies a wall of a combustion chamber within which there are provided a plurality of burners. In FIG. 1 there is shown a single burner 12, the flame of which is to be detected by a flame-detecting device, generally shown at 13.

The flame-detecting device has a generally cylindrical casing 14 of heat-resistant material, such as metal, with an opening 15 and a conduit 16. The casing 14 penetrates through and is secured to the chamber wall 11 as shown. Since atmosphere in the combustion chamber will be about 840 degrees F. (450° C.), relatively lower temperature air is sent into the casing 14 through the conduit 16, as shown at an arrow, for cooling of the flame-detecting device.

At an outside end of the casing 14, there is provided an end wall 17 to the casing through which an inner casing 18 of heat-resistant material, such as metal, is secured. Adjustably mounted on the innermost end of the inner casing 18 is a field-limiting device, generally shown at 19. Flexible light guide means such, for example, as a fiber scope 20, known in the art, interconnect the field-limiting device and a light-responsive means 21 including a light-responsive element 22 such, for example, as a photo-transistor, and electric circuitry 23 for actuating the light-responsive element, as known in the art. The light guide 20 and the light-responsive means 21 are protected from ambient conditions by the inner casing 18. The light-responsive means 21 is disposed outside the chamber wall 11 by a predetermined distance by means of using the light guide 20 for protecting the light-responsive means 21 from being exposed to excessive heat from combustion.

Referring to FIG. 2, a tubular shaped stationary support member 31 of heat resistant material, such as metal, is mounted on the inner end of the inner casing 18 and secured thereto by a screw nut 32 having a central hole. Adjustably mounted on the stationary support member 31 is a U-shaped support member 33 of metal. This adjustably mounted member 33 has leg portions **33*a* and 33*b* and is pivotally supported by pins 34*a* and 34*b*. On the leg 33*b* there is provided a securing screw 35 to keep the desired relation between adjustable and stationary members 33 and 31**, respectively.

The flexible light guide member 20 passes through the central hole of the nut 32 and also through a hole **33*c* provided at the base portion of the U-shaped adjustable member 33. Innermost end surface 20*a*** of the light guide 20 is aligned with an outer surface of the base portion of the U-shaped adjustable member 33, and the light guide 20 is secured to the base portion by a packing member 36 and a tubular screw 37, surrounding the light guide. Thus, light, usually infra-red light, impinging on the light-receiving surface 20*a* of the light guide 20 is transmitted to the light-responsive element 22, shown in FIG. 1, to develop an electrical signal responsive to the light.

A convex lens member 40 is coaxial with the light-receiving end surface 20*a* of the light guide 20 but spaced therefrom by predetermined distance longer than the focal length of the lens member. In order to support the lens member 40 and also to pass only the light from the lens member 40, there is provided a cylindrical shell 41, having a free end in which the lens member 40 is mounted and a fixed end secured to the adjustably mounted member 33.

As is easily understood from FIG. 2, parallel light rays, represented by dotted lines 42 and 43, impinging on the lens member 40 are converged to a focal point of the lens, and then diverge slightly to impinge upon the light-receiving surface 20*a* of the light guide 20. That is, parallel light rays impinging substantially perpendicularly on the lens member 40 converge uniformly and then diverge onto the light-receiving surface 20*a*. From this it seems that the field of the flame-detector is limited within an area defined by dotted lines 42 and 43. However, extraneous light, i.e., light from outside of the area defined by dotted lines 42 and 43, may actually impinge on the light-receiving surface 20*a* of the light guide 20 as explained hereinafter.

According to this embodiment, in order to prevent undesirable light beams from passing to the receiving surface 20*a* of the light guide 20, an aperture-defining member 44 is positioned within the shell member 41 approximately at the focal point of the lens 40. The aperture-defining member 44 according to this embodiment is made of non-light transmissive, heat-resistant material such as metal and has a pin hole to form the aperture. The diameter of the aperture of the aperture-defining member 44 should be smaller than that of the receiving surface 20*a* of the light guide 20.

In FIG. 3 are illustrated two typical cases of undesirable and extraneous light passing to the receiving surface 20*a* of the photo-guide 20 when the aperture-defining member 44 is not provided.

A light beam passing through the center of the lens 40, such as that shown by solid lines 45 and 46, is not refracted so that such light beam converging by an angle $\theta_1$ impinges on the light-receiving surface 20*a*. This means that if a distance from the lens member 40 to a flame to be detected is longer than a certain value, extraneous light from outside of the area defined by dotted lines 42 and 43 in FIG. 2 may impinge on the light-receiving surface 20*a*.

A light beam focusing at a focal point 47 of the lens 40 on the opposite side of the lens member 40 from the light guide 20 is refracted to parallel light beams by the lens member and impinges on the receiving surface 20*a* of the light guide 20, as shown at dotted lines 48 and 49. This also means that extraneous light beams converging by an angle $\theta_2$ impinge on the light-receiving surface 20*a*. Thus, if the aperture-defining member 44 is not provided, extraneous light beams impinging obliquely on the lens member 40 also impinge on the light-receiving surface 20*a* so that the flame-detecting apparatus develops an error signal in response to flame outside the field to be detected.

According to this invention, the aperture-defining member 44 is positioned at a focal point of the lens 40 adjacent the light guide 20, whereby extraneous light can be effectively eliminated.

In a practical experimentation, a convex lens of focal length of 48 mm with a diameter of 12 mm has been disposed at a distance of 62 mm (which is longer by 14 mm than the focal length) from the receiving surface 20*a* of the light guide 20. An aperture diameter of the aperture-defining member has been 1 mm while the diameter of the receiving surface of the light guide 20 has been 3 mm. Good result has been attained within a range of 3 meters with respect to distance between flame and the detector.

According to calculation, the aperture diameter of the aperture-defining member is preferably 0.3 mm while the other dimensions are the same as above. However, foreign materials such as dust are likely to stick to the inside wall of the aperture of the aperture-defining member at least partially closing the aperture, when the diameter of the aperture is too small. Thus, in the above experimentation, the diameter of the aperture is found to be preferably around 1 mm when the aperture-defining member 44 is made from a single plate.

FIGS. 4A through 7B show embodiments of the aperture-defining member 44 for preventing foreign materials from sticking to the perforation to cause substantial closure of the aperture. According to these embodiments, the aperture-defining member has at least two surfaces substantially facing, individually, the lens member 40 or the light-receiving surface 20*a*. Each of the surfaces of member 44 has an open portion formed by a through hole which combine to form the aperture. The open portions, each having an area larger than that of the light-receiving surface 20*a*, are staggered such that a common aperture forms a light passage having a cross section smaller than the area of the light-receiving surface 20*a* and smaller than any one of the open portions.

In FIGS. 4A through 6B, the aperture-defining member is formed by light-intercepting members of non-light transmissive and heat resistant material such as metal plates. Each of the light-intercepting members has a relatively large central open portion. The intercepting members are disposed substantially perpendicularly to the light axis of the lens member and spaced a small distance from each other and the open portions are positioned so as to partially overlap, thus forming a light passage around the light axis of the lens member.

Figure 4A:
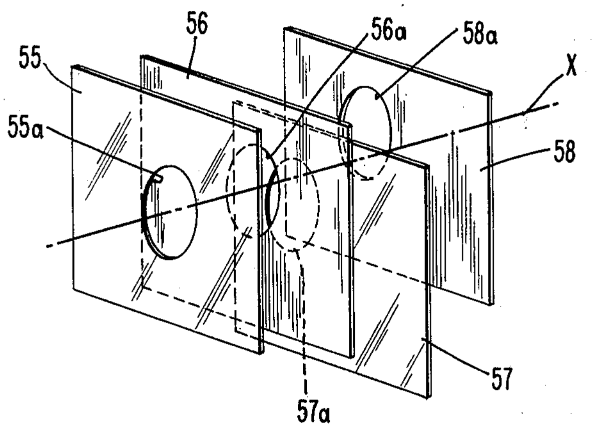
Figure 4B:
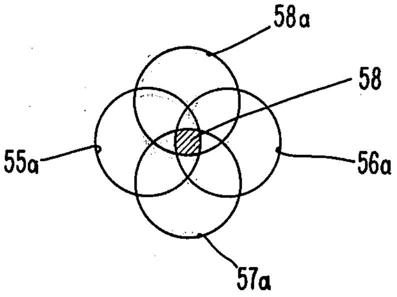

In FIG. 4A, there are four light-intercepting plates 55, 56, 57, and 58 of non-light transmissive and heat resistant material such as metal. Each of the intercepting members or plates has an open portion in the form of a relatively large circular through hole 55*a*, 56*a*, 57*a*, and 57*a*, respectively. The intercepting plates 55, 56, 57, and 58 are disposed substantially perpendicularly to the light axis of the lens member 40 with clearance fixed between successive plates in such a manner as follows. The circular holes are, as shown in FIG. 4B, staggered or partly overlapped, and centers thereof are, for example, disposed at corners of an imaginary square, thereby forming the light passage 58 around the light axis X of the lens member 40.

Figure 5A:
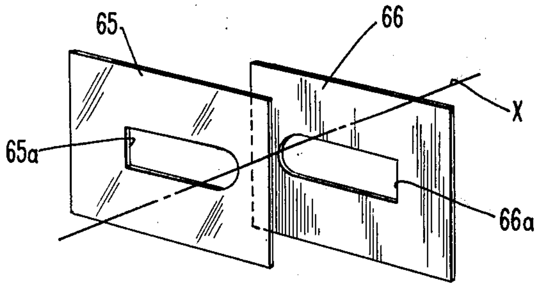

In FIG. 5A, there are two light-intercepting plates 65 and 66, each having a substantially oblong-shaped through hole 65*a*, 66*a*, the holes each having an arcuate end. These members 65 and 66 are overlaid with a little air gap therebetween in a relation that the arcuate portions of the oblong holes 65*a* and 66*a* are partly overlapped to define the light passage around the light axis X of the lens member 40 while the other ends of the oblong holes 65*a* and 66*a* extend in the opposite directions. Thus a predetermined light passage 67 is defined as shown in FIG. 5B.

Figure 5B:
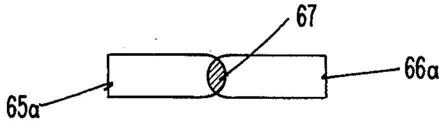
Figure 6A:
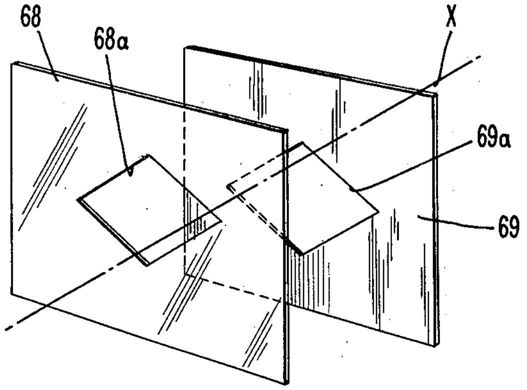
Figure 6B:
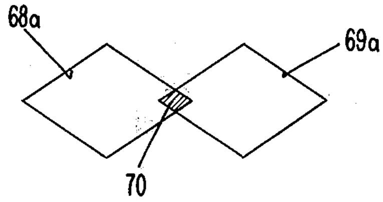

In FIGS. 6A and 6B, the shape of the holes provided in the intercepting plates of the embodiment shown in FIGS. 5A and 5B is modified. Intercepting plates 68 and 69 have diamond-shaped holes 68*a* and 69*a* respectively whereby a resulting light passage 70 is also diamond shaped as shown in FIG. 6B.

According to these embodiments, since the holes of the intercepting plates are relatively large, although the cross-sectional dimension of the light passage is relatively small, the blocking of the light passage by foreign material such as dust sticking to edges of the holes in the intercepting plates is prevented.

Figure 7A:
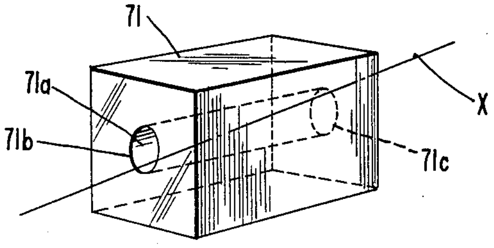
Figure 7B:
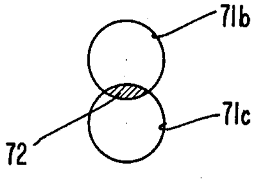

Referring now to FIGS. 7A and 7B, a light intercepting body 71 of non-light transmissive and heat resistant material such as metal having relatively large thickness along the light axis of the lens member 40 is employed. The body 71 has a cylindrical through bore 71*a* of a relatively large diameter. The bore 71*a* has an axis skewed to the light axis X of the lens 40 but includes the light axis X. Thus an open portion 71*b* of one surface of the body 71 is partly overlapped with an open portion 71*c* of the opposite surface of the body 71 when seen in the direction of the light axis X, as shown in FIG. 7B. It is apparent that a hatched area 72 forms the light passage. In this embodiment, the diameter of the bore 71*a* is relatively large for preventing blockage of the bore by dust accumulating on the surface.

The plates of the embodiment of FIGS. 4A, 5A and 6A, as illustrated, are rectangular in shape. It is obvious that they may be fabricated in any convenient shape. For mounting on the cylinder shell 41, it is preferred that they first be mounted in a frame giving proper relative positioning, including clearance between the plates, and the frame mounted in the shell 41. Likewise, the body 71 of the embodiment of FIG. 7A may have any convenient shape in cross section and may be mounted in any convenient frame before positioning on the shell 41.

Although described above are preferred embodimemts, there may be many modifications or changes within the scope of the appended claims or spirit of the invention.

What is claimed is:

1. Flame-detecting apparatus comprising:

light-responsive means to develop an electric signal in response to light rays to be detected;

light guide means having a light-receiving surface for transmitting light received by said light-receiving surface to said light-responsive means;

field-limiting means, including a convex lens member, aperture-defining means and a cylindrical shell member, for defining a field to be monitored;

said convex lens member being positioned at a distance from said surface longer than the focal length of said convex lens member, parallel light rays from a detected flame impinging substantially perpendicularly on said convex lens member being converged and then diverging onto said light-receiving surface;

said aperture-defining means being positioned between said convex lens member and said light-receiving surface at approximately a focal point of said convex lens member for only giving a single light passage around a light axis of said convex lens member, the cross-sectional area of said light passage being smaller than that of said light-receiving surface; and said cylindrical shell member being fixed to said light guide means for supporting said convex lens member and said aperture-defining means and for preventing ambient light from impinging on said light-receiving surface except through said convex lens member.

2. Flame-detecting apparatus according to claim 1 wherein said aperture-defining means includes a non-light-transmissive and heat-resistant plate having a single pin hole defining said light passage.

3. Flame-detecting apparatus according to claim 1 wherein said aperture-defining means includes means for preventing foreign materials from causing substantial closure of an aperture so defined.

4. Flame-detecting apparatus according to claim 3, wherein said aperture-defining means is made of non-light-transmissive, heat-resistant material and has at least two surfaces substantially facing, individually, to said convex lens member or to said light-receiving surface of said light guide means, each said surface having an open portion of an area larger than that of said light-receiving surface, and said open portions being staggered for defining said light passage from said convex lens means to said light-receiving surface.

5. Flame-detecting apparatus according to claim 4, wherein said aperture-defining means comprises a plurality of non-light-transmissive and heat-resistant plate members, each having a through hole to form said open portion of said surface.

6. Flame-detecting apparatus according to claim 5, wherein said plate members comprise four plate members having through holes to form said open portions and being disposed substantially perpendicularly to said light axis with clearance between successive plates along said light axis.

7. Flame-detecting apparatus according to claim 6, wherein said through holes are circular.

8. Flame-detecting apparatus according to claim 5, wherein said plate members comprise two plate members having through holes to form said open portions and being disposed substantially perpendicularly to said light axis with clearance therebetween along said light axis.

9. Flame-detecting apparatus according to claim 8, wherein said through holes are substantially oblong, at least one end of each of said through holes being arcuate and the arcuate portions of said through holes being partially overlapped.

10. Flame-detecting apparatus according to claim 8, wherein said through holes are diamond shaped.

11. Flame-detecting apparatus according to claim 4, wherein said aperture-defining means comprises a solid body having relatively large thickness along said light axis of said lens member and also having a cylindrical through bore which has a cross-sectional diameter larger than that of said light passage, at least a portion of said bore being skewed to said light axis of said lens member thereby defining said light passage.

* * * * *